(12) United States Patent
Lemke et al.

(10) Patent No.: US 11,174,047 B2
(45) Date of Patent: Nov. 16, 2021

(54) SPACECRAFT CONTROL SYSTEM FOR DETERMINING REACTION TORQUE

(71) Applicant: The Boeing Company, Chicago, IL (US)

(72) Inventors: Gary E. Lemke, Torrance, CA (US); John Preston Charles Mills, Redondo Beach, CA (US); Christopher James Wasson, Torrance, CA (US); Cecilia G. Cantu, Playa Del Rey, CA (US)

(73) Assignee: The Boeing Company, Chicago, IL (US)

( * ) Notice: Subject to any disclaimer, the term of this patent is extended or adjusted under 35 U.S.C. 154(b) by 344 days.

(21) Appl. No.: 16/425,303

(22) Filed: May 29, 2019

(65) Prior Publication Data

US 2020/0377236 A1  Dec. 3, 2020

(51) Int. Cl.
*B64G 1/32* (2006.01)
*B64G 1/36* (2006.01)
*B64G 1/28* (2006.01)

(52) U.S. Cl.
CPC .............. *B64G 1/32* (2013.01); *B64G 1/28* (2013.01); *B64G 1/366* (2013.01)

(58) Field of Classification Search
CPC . B64G 1/32; B64G 1/366; B64G 1/28; B64G 1/363; B64G 1/365; B64G 1/36; B64G 1/428; B64G 1/422; B64G 1/425; B64G 1/44; B64G 1/283; B64G 1/286; B64G 1/405; B64G 1/288; B64G 1/361; B64G 1/242; B64G 1/244
See application file for complete search history.

(56) References Cited

U.S. PATENT DOCUMENTS

| 5,788,188 A |   | 8/1998 | Damilano |
|---|---|---|---|
| 6,021,979 A | * | 2/2000 | Bender .................. B64G 1/244 |
|   |   |   | 244/164 |

(Continued)

FOREIGN PATENT DOCUMENTS

| WO | 2019191294 A1 | 10/2019 |
|---|---|---|
| WO | 2020188207 A1 | 9/2020 |

OTHER PUBLICATIONS

Response to Non-Final Office Action dated Apr. 8, 2021, U.S. Appl. No. 15/425,926.

(Continued)

*Primary Examiner* — Medhat Badawi
*Assistant Examiner* — Vicente Rodriguez
(74) *Attorney, Agent, or Firm* — Vivacqua Crane, PLLC (57) ABSTRACT

A control system for a spacecraft for determining a resultant torque that is exerted upon a spacecraft by one or more magnetic torque rods is disclosed. The spacecraft is configured to revolve around a celestial body in an orbit. A magnetic field of the celestial body is predictable, and a direction of the magnetic field located around the orbit is fixed. The control system includes the one or more magnetic torque rods, one or more processors in electronic communication with the one or more magnetic torque rods, and a memory coupled to the one or more processors. The memory stores data into a database and program code that, when executed by the one or more processors, causes the control system to instruct the one or more magnetic torque rods to exert the resultant torque upon the spacecraft.

20 Claims, 6 Drawing Sheets

(56) References Cited

U.S. PATENT DOCUMENTS

| | | | |
|---|---|---|---|
| 6,205,378 B1* | 3/2001 | Rodden | B64G 1/26 |
| | | | 701/13 |
| 6,318,676 B1 | 11/2001 | Turner et al. | |
| 7,051,981 B2 | 5/2006 | Wehner et al. | |
| 7,823,836 B2 | 11/2010 | Ho et al. | |
| 10,464,694 B1 | 11/2019 | Schwarz et al. | |
| 2003/0149529 A1* | 8/2003 | Heatwole | B64G 1/288 |
| | | | 701/501 |
| 2005/0263647 A1* | 12/2005 | Wehner | B64G 1/58 |
| | | | 244/168 |
| 2006/0186274 A1 | 8/2006 | Wang et al. | |
| 2008/0128559 A1 | 6/2008 | Ho et al. | |
| 2011/0168848 A1 | 7/2011 | Ih et al. | |
| 2013/0313369 A1 | 11/2013 | Celerier | |
| 2014/0034784 A1 | 2/2014 | Forestier et al. | |
| 2014/0209750 A1 | 7/2014 | Guyot | |
| 2016/0116639 A1 | 4/2016 | Engell | |
| 2016/0244189 A1 | 8/2016 | Turner | |
| 2017/0129627 A1 | 5/2017 | Moro et al. | |
| 2018/0339792 A1 | 11/2018 | Cooper | |
| 2020/0140122 A1 | 5/2020 | Gunther et al. | |
| 2020/0377235 A1 | 12/2020 | Wasson | |
| 2020/0377240 A1 | 12/2020 | Cantu | |

OTHER PUBLICATIONS

EP, Search Report, EP Patent Application 20175966.9-1010 (dated Oct. 22, 2020).
United States Patent and Trademark Office. Non-Final Office Action for U.S. Appl. No. 16/425,282, dated Jul. 15, 2021, pp. 1-22.
United States Patent and Trademark Office. Final Office Action for U.S. Appl. No. 16/425,296, dated Aug. 17, 2021, pp. 1-14.
Nehrenz et al. "On the Development of Spacecraft Operating Modes for a Deep Space CubeSat," 2015, American Institute of Aeronautics and Astronautics, pp. 1-10.
Soat "Architecutre of Attitude Determination and Control Subsystem in Consideration of Mode Sequences for Micro Dragon Satellite by Using SysML," Sep. 2016, Keio University, pp. 1-102.
Bigelow. "Attitude Determination and Control, On Board Computing & Communication Subsystem Design for CubeSat Mission," Mar. 2011, Worcester Polytechnic Institute, pp. 1-66.

* cited by examiner

SPACECRAFT CONTROL SYSTEM FOR DETERMINING REACTION TORQUE

INTRODUCTION

The present disclosure relates to a control system and method for a spacecraft. More particularly, the disclosure relates to a control system that calculates a resultant torque that is imparted upon the spacecraft by one or more magnetic torque rods without requiring ephemeris information.

BACKGROUND

A spacecraft may revolve around a celestial body, such as Earth, in an orbit. Magnetic torque rods, which are also referred to as torque rods, are used for active momentum control in a spacecraft. Magnetic torque rods may carry electric current having an associated magnetic field that interacts with the Earth's local magnetic field, which produces a resultant torque imparted upon a spacecraft. The resultant torque imparted upon the spacecraft is determined based on the magnetic field associated with the magnetic torque rods as well as the Earth's local magnetic field at a given point in time. Based on an estimate of the Earth's local magnetic field, the spacecraft's flight computer may impart a target torque upon the spacecraft by actively manipulating the magnetic field of the torque rod. The flight computer of the spacecraft may use ephemeris knowledge to calculate the Earth's local magnetic field at a given point in time. Specifically, the ephemeris knowledge indicates the specific location of the spacecraft relative to the celestial body that the spacecraft revolves around.

Sometimes the flight computer of the spacecraft may not have access or may lose access to the available ephemeris information that is required to determine the Earth's magnetic field, which is then used to calculate the resultant torque. For example, ephemeris information may not be available during launch vehicle separation or during some contingency scenarios such as a processor reset. However, the magnetic torque rods still need to impart the torque upon the spacecraft for purposes of momentum management.

SUMMARY

According to several aspects, a control system for a spacecraft configured to revolve around a celestial body in an orbit is disclosed. The control system includes one or more magnetic torque rods, one or more processors in electronic communication with the one or more magnetic torque rods, and a memory coupled to the one or more processors. The memory stores data into a database and program code that, when executed by the one or more processors, causes the control system to determine ephemeris information regarding a position of the spacecraft relative to the celestial body is inaccessible. A magnetic field of the celestial body is predictable, and a direction of the magnetic field located around the orbit is fixed. In response to determining the ephemeris information is inaccessible, the control system calculates a resultant torque imparted upon the spacecraft by the one or more magnetic torque rods based on a dipole moment of the one or more magnetic torque rods and an average magnetic field estimate of the celestial body. The control system is also caused to instruct the one or more magnetic torque rods to exert the resultant torque upon the spacecraft.

A spacecraft configured to revolve around a celestial body in an orbit is disclosed. The spacecraft includes plurality of external actuators that include one or more magnetic torque rods, one or more processors in electronic communication with the plurality of external actuators, and a memory coupled to the one or more processors. The memory stores data into a database and program code that, when executed by the one or more processors, causes the spacecraft to determine ephemeris information regarding a position of the spacecraft relative to the celestial body is inaccessible. A magnetic field of the celestial body is predictable, and a direction of the magnetic field located around the orbit is fixed. In response to determining the ephemeris information is inaccessible, the spacecraft is caused to calculate a resultant torque imparted upon the spacecraft by the one or more magnetic torque rods based on a dipole moment of the one or more magnetic torque rods and an average magnetic field estimate of the celestial body. The spacecraft is also caused to instruct the one or more magnetic torque rods to exert the resultant torque upon the spacecraft.

A method for determining a resultant torque imparted upon a spacecraft by one or more magnetic torque rods is disclosed. The spacecraft is configured to revolve around a celestial body in an orbit. The method includes determining, by a computer, ephemeris information regarding a position of the spacecraft relative to the celestial body is inaccessible. A magnetic field of the celestial body is predictable, and a direction of the magnetic field located around the orbit of the spacecraft is fixed. In response to determining the ephemeris information is inaccessible, the method includes calculating a resultant torque imparted upon the spacecraft by the one or more magnetic torque rods based on a dipole moment of the one or more magnetic torque rods and an average magnetic field estimate of the celestial body. Finally, the method includes instructing the one or more magnetic torque rods to exert the resultant torque upon the spacecraft.

The features, functions, and advantages that have been discussed may be achieved independently in various embodiments or may be combined in other embodiments further details of which can be seen with reference to the following description and drawings.

BRIEF DESCRIPTION OF THE DRAWINGS

The drawings described herein are for illustration purposes only and are not intended to limit the scope of the present disclosure in any way.

DETAILED DESCRIPTION

The present disclosure is directed towards a control system for a spacecraft that revolves around a celestial body.

The celestial body has a predictable magnetic field. Moreover, the direction of the magnetic field of the celestial body remains fixed with respect to an orbit of the spacecraft. The control system executes a magnetic torque control strategy that determines a resultant torque that is imparted upon the spacecraft by one or more magnetic torque rods. Specifically, the resultant torque that is imparted upon the spacecraft is calculated based on a dipole moment of the magnetic torque rods and an average magnetic field estimate of the celestial body. The disclosed magnetic torque control strategy does not require ephemeris knowledge to calculate the resultant torque.

The following description is merely exemplary in nature and is not intended to limit the present disclosure, application, or uses.

Figure 1:
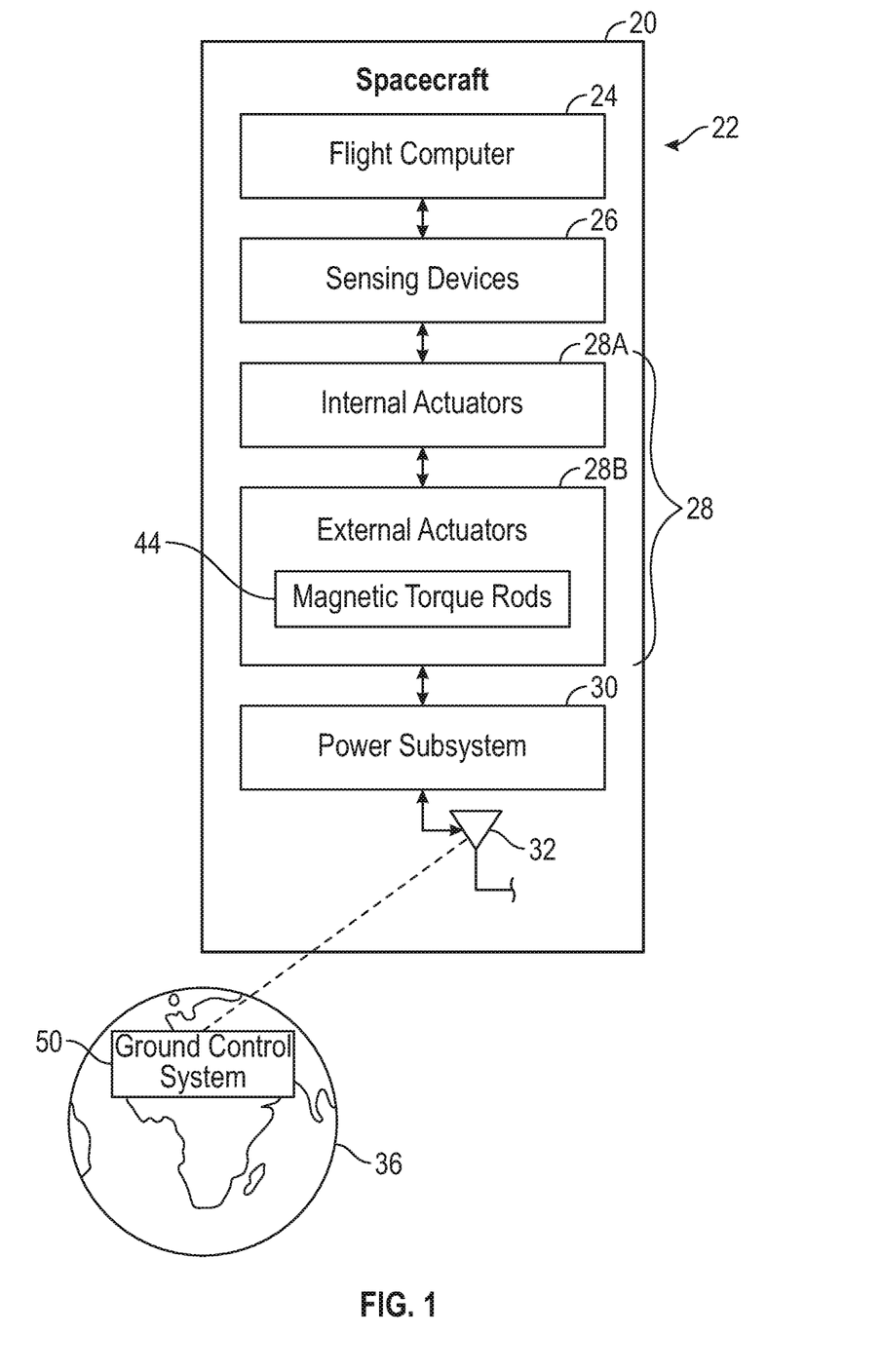
FIG. 1 is a schematic diagram of a spacecraft having a control system for executing a magnetic torque control strategy, according to an exemplary embodiment.
Figure 5:
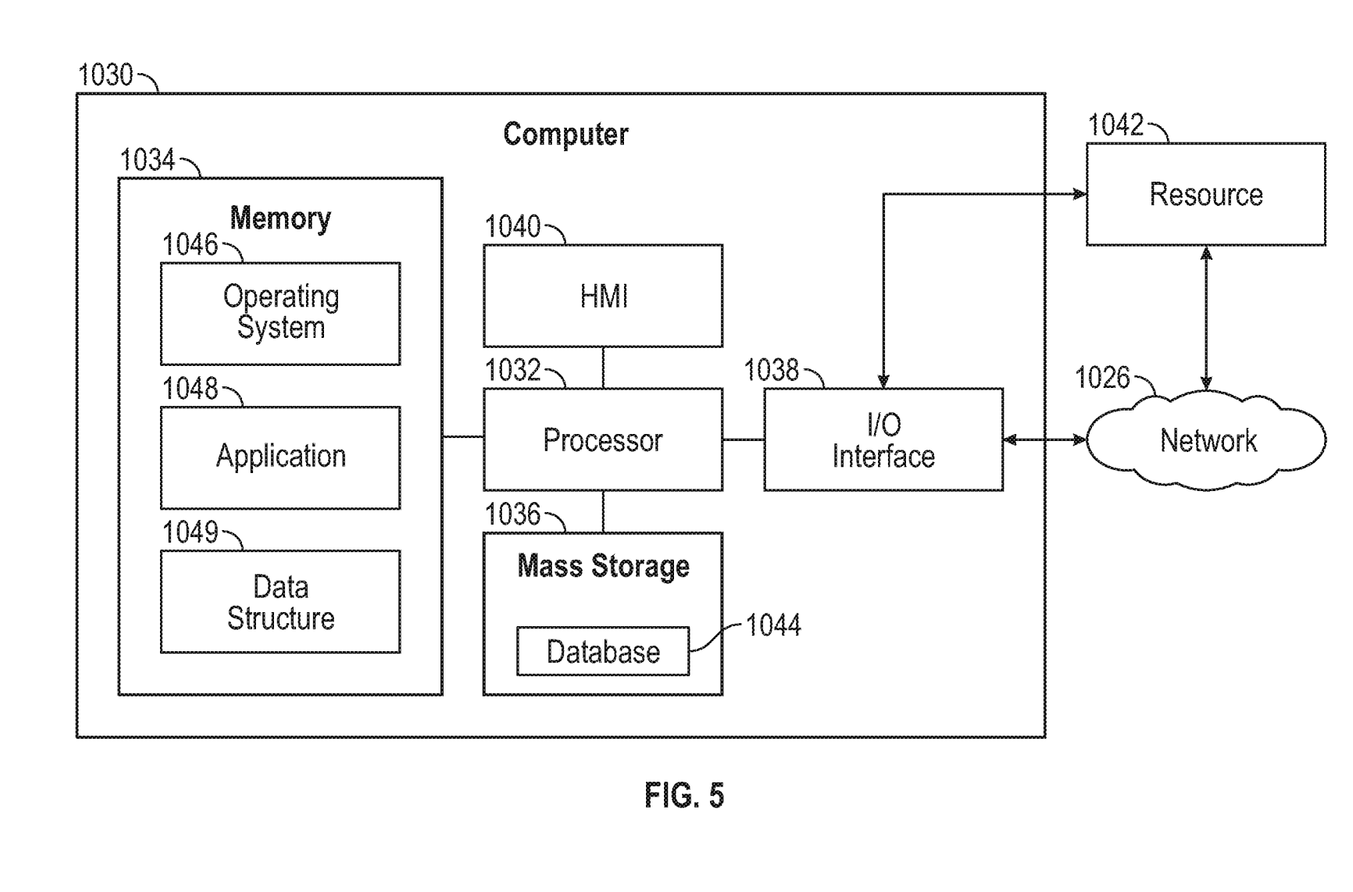
FIG. 5 is an illustration of a computer system, according to an exemplary embodiment.

Referring to FIG. 1, a schematic diagram of an exemplary spacecraft 20 is illustrated. The spacecraft 20 includes a control system 22 including one or more flight computers 24 that are in electronic communication with a plurality of sensing devices 26, one or more actuators 28, one or more power subsystems 30, and one or more antennas 32. A detailed diagram of an exemplary flight computer 24 is shown in FIG. 5 and is described below. The one or more actuators 28 include a plurality of internal actuators 28A and a plurality of external actuators 28B. Specifically, the internal actuators 28A are momentum storage devices such as, but not limited to, reaction wheels and control moment gyroscopes. The plurality of external actuators 28B may also be referred to as momentum control actuators and exert an external torque upon the spacecraft 20. The plurality of external actuators 28B include one or more magnetic torque rods 44. The external actuators 28B may also include any type of thruster such as, but not limited to, ion thrusters and Hall thrusters. As explained below, the flight computers 24 execute a magnetic torque control strategy that determines a resultant torque that is imparted upon the spacecraft 20 by the one or more magnetic torque rods 44 when the spacecraft 20 is in orbit.

Continuing to refer to FIG. 1, the sensing devices 26 include devices such as, but not limited to, a star tracker, a gyroscope, a magnetometer, a sun sensor, an earth sensor, an accelerometer, and a global positioning system (GPS). The power subsystems 30 store and provide electrical power to the various components of the spacecraft 20 and include devices such as, but not limited to, solar panels, radioisotope thermoelectric generators, batteries, capacitor banks, and heat engines.

Figure 2A:
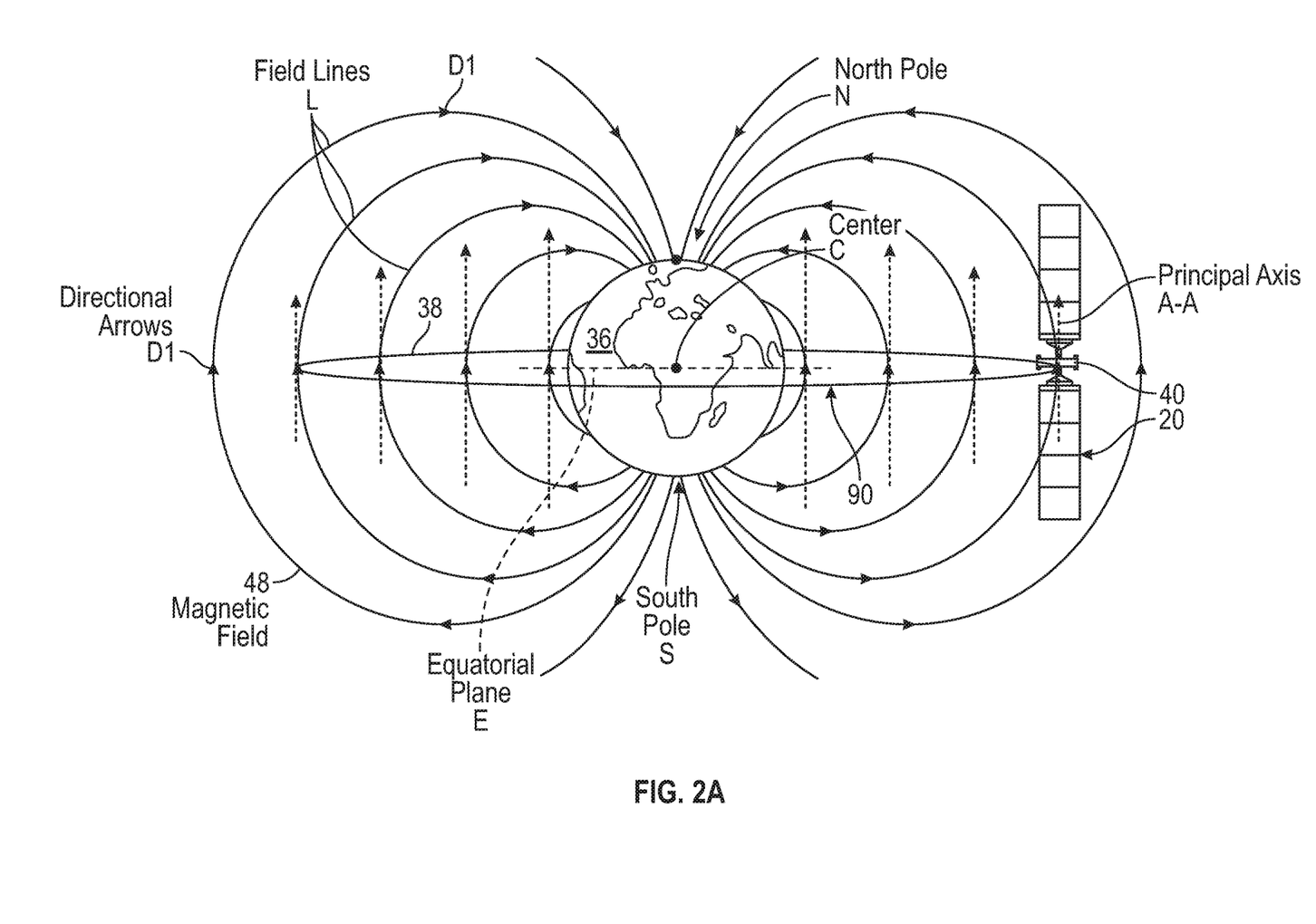
FIG. 2A is a schematic diagram of the spacecraft revolving around a celestial body, where a magnetic field is substantially uniform around an orbit of the spacecraft, according to an exemplary embodiment.
Figure 2B:
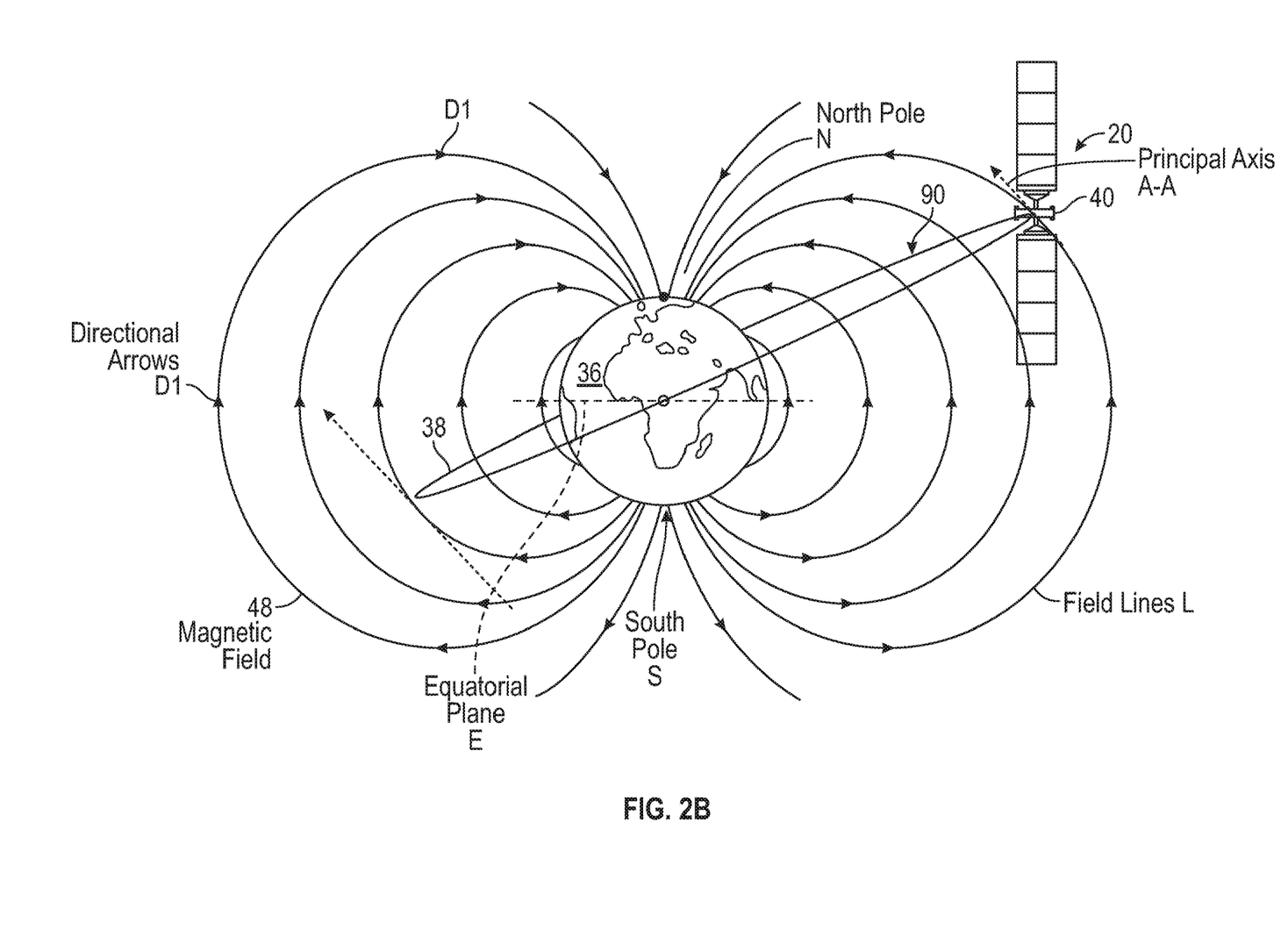
FIG. 2B is a schematic diagram of the spacecraft revolving around the celestial body, where a magnetic field magnitude varies, but the magnetic field direction is substantially uniform around the orbit of the spacecraft, according to an exemplary embodiment.

As seen in FIGS. 2A and 2B, the spacecraft 20 is configured to revolve around a celestial body 36. Specifically, the spacecraft 20 revolves in an orbit 38 around the celestial body 36. Although FIGS. 2A and 2B illustrate the Earth as the celestial body 36, this illustration is merely exemplary in nature. The celestial body 36 is any heavenly body having a magnetic field 48 that is predictable and, for an orbit 38 of the spacecraft 20, a direction of the magnetic field 48 remains fixed relative to an inertial frame of reference for the spacecraft 20. For example, the directional arrows D1 seen in FIGS. 2A and 2B, which indicate the direction of the magnetic field 48, are each oriented in the same direction as one another regardless of the position of the spacecraft 20 around the orbit 38. Therefore, the direction of the magnetic field 48 of the celestial body 36 remains the same when measured around the orbit 38 of the spacecraft 20.

In an embodiment, the celestial body 36 possesses an internally generated magnetic field 48. For example, the Earth produces its own internally generated magnetic field. Therefore, the present disclosure is applicable to a celestial body with an internally generated magnetic field. However, it is to be appreciated that the celestial body 36 does not necessarily require an internally generated magnetic field 48. Instead, the celestial body 36 requires a fixed magnetic field direction around a given orbit of the spacecraft 20. In the embodiment as shown in the figures, the celestial body 36 includes a dipole magnetic field having a North Pole N and a South Pole S, where the magnetic field 48 is directed from the South Pole S to the North Pole N. However, it is to be appreciated that the magnetic field 48 shown in the figures is merely exemplary in nature.

In the embodiment as shown in FIG. 2A, the orbit 38 around the celestial body 36 is shown as substantially circular, and the celestial body 36 is positioned at a central point C of the orbit 38. Furthermore, the orbit 38 shown in FIG. 2A is angled at about zero degrees (0°) with respect to an equatorial plane E of the celestial body 36. Therefore, in the embodiment as shown in FIG. 2A, a strength of the magnetic field 48 is substantially uniform around a circumference 90 of the orbit 38 of the spacecraft 20.

The magnetic field strength is expressed by a magnetic flux $\varphi$ and a flux density B of the magnetic field 48. The magnetic flux $\varphi$ is based on a number of field lines L that pass through a specific plane or surface, and the flux density B is the magnetic flux per unit area. As seen in FIG. 2A, the field lines L that pass through the circumference 90 of the orbit 38 of the spacecraft 20 are about equidistant with respect to one another. Thus, a value of the magnetic flux $\varphi$ of the magnetic field 48 of the celestial body 36 is substantially constant when measured around the circumference 90 of the orbit 38.

FIG. 2B illustrates the orbit 38 having an elliptical profile that is eccentric. In the embodiment as shown, the elliptical profile includes a relatively high eccentricity. However, it is to be appreciated that this illustration is merely exemplary in nature and other eccentricities may be used as well. Furthermore, unlike the embodiment as shown in FIG. 2A, the orbit 38 in FIG. 2B is inclined. In other words, the orbit 38 shown in FIG. 2B is positioned at a non-zero angle with respect to the equatorial plane E of the celestial body 36. Therefore, the value of the magnetic flux of the magnetic field of the celestial body 36 varies when measured around the circumference 90 of the orbit 38. However, it is to be appreciated that the disclosed magnetic torque control strategy applies to the spacecraft 20 shown in FIG. 2B as well, since the direction of the magnetic field 48 remains the same around the orbit 38.

Referring to both FIGS. 1, 2A, and 2B, the flight computers 24 of the spacecraft 20 are in wireless communication with a ground control system 50 by the antennas 32. In an embodiment, the ground control system 50 is located upon the celestial body 36 that the spacecraft 20 orbits around. For example, the ground control system 50 may be located upon the Earth. Alternatively, the ground control system 50 may be located on Earth, but the spacecraft 20 may be orbiting another celestial body 36. The ground control system 50 includes one or more computers that send and receive data from the flight computers 24 of the spacecraft 20.

Figure 3:
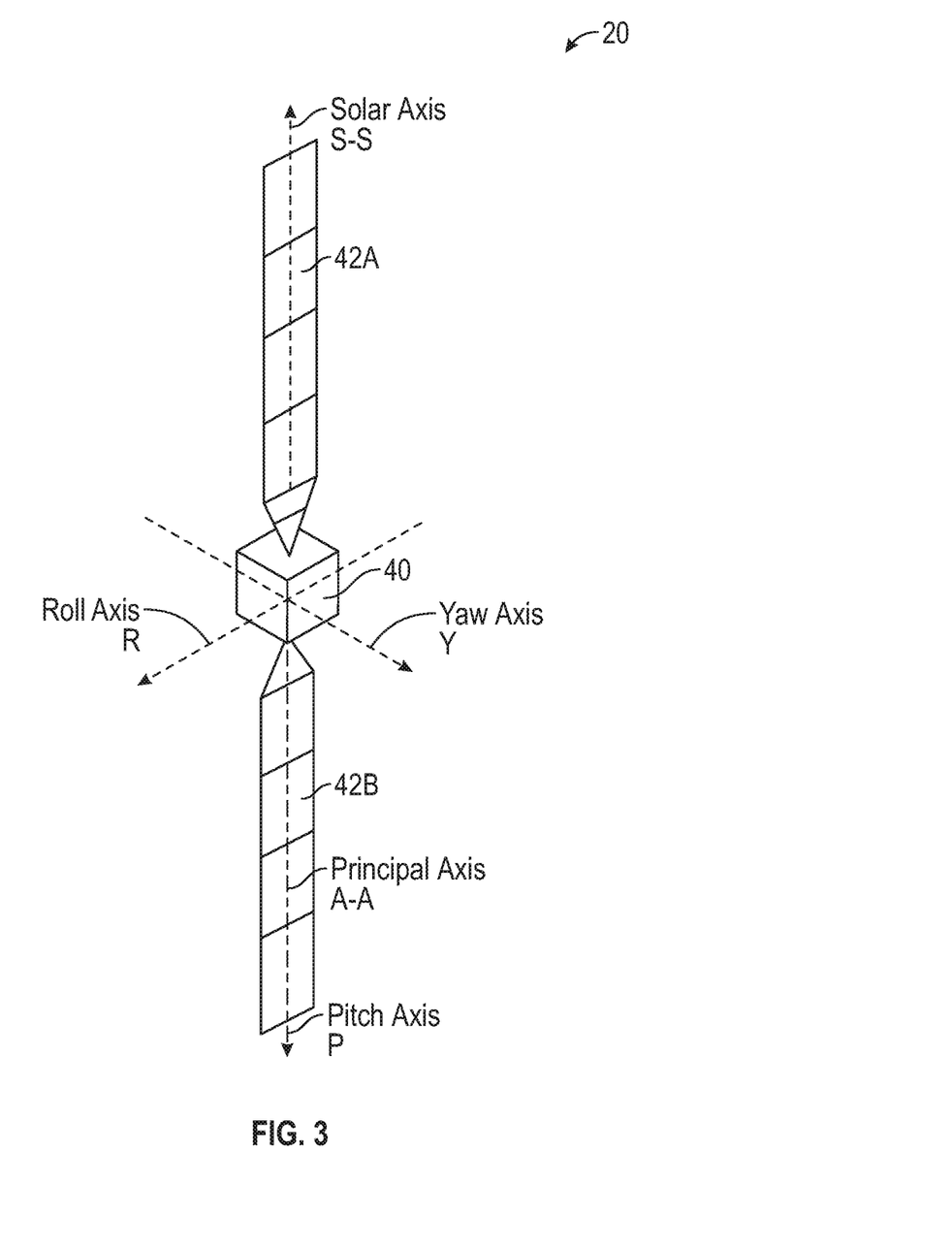
FIG. 3 is a perspective view of a spacecraft that includes two solar wings, according to an exemplary embodiment.

FIG. 3 is an enlarged view of the spacecraft 20 shown in FIGS. 2A and 2B. The spacecraft 20 includes a main body 40 that defines an axis that is aligned with a minor principal moment of inertia, which is referred to as a principal axis A-A. The principal axis A-A is positioned substantially perpendicular with respect to a roll axis R and a yaw axis Y of the main body 40 of the spacecraft 20. The principal axis A-A is also substantially aligned with a pitch axis P of the main body 40 of the spacecraft 20. In an embodiment, the spacecraft 20 includes two or more solar wings 42A, 42B that project outward from the main body 40 of the spacecraft 20 that are attached to the main body 40 of the spacecraft 20. The solar wings 42A and 42B are substantially aligned with the principal axis A-A of the spacecraft 20, where the upper or north solar wing is designated as solar wing 42A and a lower or south solar wing is designated as solar wing 42B. In the embodiment as shown, a solar axis S-S of the spacecraft 20 is substantially aligned with the principal axis A-A. Although FIG. 3 illustrates solar wings 42A, 42B that derive electrical power from sunlight, it is to be appreciated that other electrical devices for generating power may be used as well. Moreover, in another embodiment the spacecraft 20 may not include solar wings.

Referring to FIGS. 1, 2A, and 2B, the flight computers 24 normally calculate a resultant torque that is imparted upon the spacecraft 20 by the one or more magnetic torque rods 44 based on ephemeris information of the spacecraft 20. The ephemeris information indicates a position of the spacecraft 20 relative to the celestial body 36. Specifically, the ephemeris information indicates a specific position of the spacecraft 20 around the orbit 38 at a given point in time.

Sometimes the flight computers 24 are unable to access to the ephemeris information regarding the spacecraft 20 for a number of reasons. For example, ephemeris information may not be available due to an issue with the flight computers' processors 1032 (seen in FIG. 5). Some examples of when ephemeris information may be inaccessible include, but are not limited to, the flight computers 24 resetting unexpectedly, or during launch vehicle separation. Specifically, during launch vehicle separation, the flight computers 24 are unable to access ephemeris information, or the spacecraft's GPS is unable to acquire position information for an extended period of time.

Once the flight computers 24 no longer have access to the ephemeris information with respect to the spacecraft 20, the disclosed magnetic torque control strategy is executed to determine the resultant torque imparted upon the spacecraft 20 by the one or more magnetic torque rods 44. The magnetic torque control strategy calculates the resultant torque imparted upon the spacecraft 20 based on an average magnetic field estimate of the celestial body 36 and the dipole moment of the one or more magnetic torque rods 44. As explained below, the dipole moment of the one or more magnetic torque rods 44 includes either a positive value or a negative value. The average magnetic field estimate (which is measured in Tesla) is a fixed vector that represents an average vector of a magnetic flux measured around the circumference 90 of the orbit 38. Thus, the flight computers 24 execute the disclosed magnetic control strategy, which is based on the average magnetic field estimate, even when the magnetic flux measured around the orbit 38 (seen in FIG. 2B) is variable. In an embodiment, the ground control system 50 (shown in FIG. 1) determines the average magnetic field estimate of the celestial body 36 for a given orbit, and then uploads the average magnetic field estimate to the flight computers 24 of the spacecraft 20.

Referring to FIGS. 1, 2A, and 2B, the spacecraft 20 is first launched into space. As mentioned above, the magnetic field of the celestial body 36 is predictable, and a direction of the magnetic field 48 located around the orbit 38 is fixed. The flight computers 24 determine the ephemeris information regarding the position of the spacecraft 20 relative to the celestial body 36 is inaccessible. As mentioned above, ephemeris knowledge indicates the specific location of the spacecraft 20 around the orbit 38 with respect to the celestial body 36.

In response to determining the ephemeris information regarding the position of the spacecraft 20 relative to the celestial body 36 is inaccessible, the magnetic torque control strategy is executed by the flight computers 24. Specifically, the flight computers 24 calculate the resultant torque imparted upon the spacecraft 20 by the one or more magnetic torque rods 44 based on the dipole moment of the one or more magnetic torque rods 44 and the average magnetic field estimate of the celestial body 36. The flight computers 24 then instruct the one or more magnetic torque rods 44 to exert the resultant torque upon the spacecraft 20.

The flight computers 24 determine the resultant torque imparted upon the spacecraft 20 by the one or more magnetic torque rods 44 based on Equation 1 below:

$$\tau = \mu \times B \quad \text{(Equation 1)}$$

where $\tau$ represents the resultant torque, $\mu$ represents the dipole moment of the one or more magnetic torque rods 44, and B represents the average magnetic field estimate of the celestial body 36. It is to be appreciated that the dipole moment of the one or more magnetic torque rods 44 includes three states, which include a positive state, a negative state, and an off state. Thus, the magnetic torque control strategy selects either the positive state, the negative state, or the off state of the dipole moment when determining the resultant torque. Specifically, in at least some embodiments, the flight computers 24 first calculate a required magnitude and direction of the resultant torque. The flight computers 24 then determine the resultant torque for both the positive state and the negative state of the dipole moment. Finally, the flight computers 24 select the positive state, negative state, or off state of the dipole moment based on the required magnitude and direction of the resultant torque.

It is to be appreciated that the resultant torque may be calculated in a variety of different ways. For example, in one approach, the resultant torque is calculated for each individual magnetic torque rod 44 separately. Thus, the dipole moment $\mu$ in Equation 1 represents a single magnetic torque rod 44 of the spacecraft, and the resultant torque $\tau$ imparted upon the spacecraft 20 is based on the single magnetic torque rod 44. The total resultant torque that is imparted upon the spacecraft 20 is determined by summing the individual resultant torques $\tau$ for each magnetic torque rod 44. Alternatively, in another approach, the dipole moment $\mu$ in Equation 1 represents all magnetic torque rods 44 on the spacecraft 20. Accordingly, the resultant torque $\tau$ imparted upon the spacecraft 20 in Equation 1 is based on all the magnetic torque rods 44 on the spacecraft.

Figure 4:
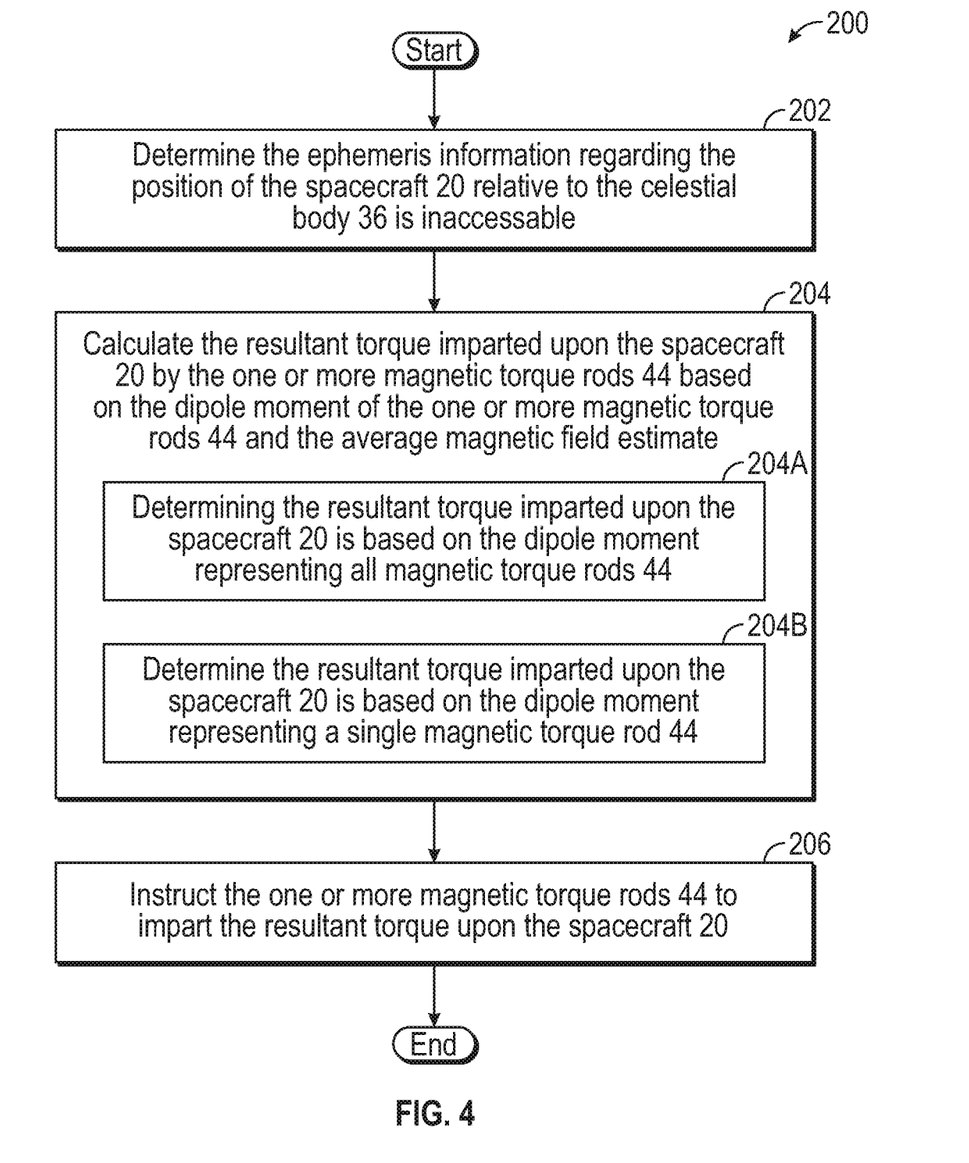
FIG. 4 is a process flow diagram illustrating a method for executing the magnetic torque control strategy.

FIG. 4 is a process flow diagram illustrating an exemplary method 200 for determining the resultant torque that is imparted upon the spacecraft 20. Referring generally to FIGS. 1, 2A, 2B, 3, and 4, the method 200 begins at block 202. In block 202, the flight computers 24 determine the ephemeris information regarding the position of the spacecraft 20 relative to the celestial body 36 is inaccessible. The method 200 may then proceed to block 204.

In block 204, in response to determining the ephemeris information regarding the position of the spacecraft 20 relative to the celestial body 36 is inaccessible, the flight computers 24 calculate the resultant torque imparted upon the spacecraft 20 by the one or more magnetic torque rods 44, which is based on the dipole moment of the one or more magnetic torque rods 44 and the average magnetic field estimate of the celestial body 36.

As mentioned above, the resultant torque may be determined using various approaches. For example, in block 204A, the method 200 includes determining the resultant torque imparted upon the spacecraft 20 is based on the dipole moment representing all the magnetic torque rods 44 on the spacecraft 20. Alternatively, in another embodiment, in block 204B, the method 200 includes determining the resultant torque imparted upon the spacecraft 20 is based on the dipole moment representing all magnetic torque rods 44 on the spacecraft 20. Either way, the method 200 may then proceed to block 206.

In block 206, the method 200 includes instructing the one or more magnetic torque rods 44 to exert the resultant torque upon the spacecraft 20. The method 200 may then terminate or repeat.

Referring generally to the figures, the disclosed magnetic torque control strategy provides an approach for imparting the resultant torques upon the spacecraft by using the magnetic torque rods, without the need for ephemeris knowledge. Conventional approaches typically use on-board ephemeris information to determine the Earth's localized magnetic field at a given point in time, where the localized magnetic field is then used to calculate the resultant torque. However, sometimes the flight computers of the spacecraft may lose the on-board ephemeris information. In contrast, the disclosed magnetic torque control strategy calculates the resultant torque based on an average magnetic field estimate of the celestial body. Accordingly, the disclosure is especially useful during launch vehicle separation or during contingency scenarios when ephemeris knowledge is not accessible, however, magnetic torque control is still necessary for momentum management of the spacecraft.

Referring now to FIG. 5, the flight computer 24 and the ground control system 50 are implemented on one or more computer devices or systems, such as exemplary computer system 1030. The computer system 1030 includes a processor 1032, a memory 1034, a mass storage memory device 1036, an input/output (I/O) interface 1038, and a Human Machine Interface (HMI) 1040. The computer system 1030 is operatively coupled to one or more external resources 1042 via the network 1026 or I/O interface 1038. External resources may include, but are not limited to, servers, databases, mass storage devices, peripheral devices, cloud-based network services, or any other suitable computer resource that may be used by the computer system 1030.

The processor 1032 includes one or more devices selected from microprocessors, micro-controllers, digital signal processors, microcomputers, central processing units, field programmable gate arrays, programmable logic devices, state machines, logic circuits, analog circuits, digital circuits, or any other devices that manipulate signals (analog or digital) based on operational instructions that are stored in the memory 1034. Memory 1034 includes a single memory device or a plurality of memory devices including, but not limited to, read-only memory (ROM), random access memory (RAM), volatile memory, non-volatile memory, static random-access memory (SRAM), dynamic random-access memory (DRAM), flash memory, cache memory, or any other device capable of storing information. The mass storage memory device 136 includes data storage devices such as a hard drive, optical drive, tape drive, volatile or non-volatile solid-state device, or any other device capable of storing information.

The processor 1032 operates under the control of an operating system 1046 that resides in memory 1034. The operating system 1046 manages computer resources so that computer program code embodied as one or more computer software applications, such as an application 1048 residing in memory 1034, may have instructions executed by the processor 1032. In an alternative embodiment, the processor 1032 may execute the application 1048 directly, in which case the operating system 1046 may be omitted. One or more data structures 1049 also reside in memory 1034, and may be used by the processor 1032, operating system 1046, or application 1048 to store or manipulate data.

The I/O interface 1038 provides a machine interface that operatively couples the processor 1032 to other devices and systems, such as the network 1026 or external resource 1042. The application 1048 thereby works cooperatively with the network 1026 or external resource 1042 by communicating via the I/O interface 1038 to provide the various features, functions, applications, processes, or modules comprising embodiments of the invention. The application 1048 also includes program code that is executed by one or more external resources 1042, or otherwise rely on functions or signals provided by other system or network components external to the computer system 1030. Indeed, given the nearly endless hardware and software configurations possible, persons having ordinary skill in the art will understand that embodiments of the invention may include applications that are located externally to the computer system 1030, distributed among multiple computers or other external resources 1042, or provided by computing resources (hardware and software) that are provided as a service over the network 1026, such as a cloud computing service.

The HMI 1040 is operatively coupled to the processor 1032 of computer system 1030 in a known manner to allow a user to interact directly with the computer system 1030. The HMI 1040 may include video or alphanumeric displays, a touch screen, a speaker, and any other suitable audio and visual indicators capable of providing data to the user. The HMI 1040 also includes input devices and controls such as an alphanumeric keyboard, a pointing device, keypads, pushbuttons, control knobs, microphones, etc., capable of accepting commands or input from the user and transmitting the entered input to the processor 1032.

A database 1044 may reside on the mass storage memory device 1036 and may be used to collect and organize data used by the various systems and modules described herein. The database 1044 may include data and supporting data structures that store and organize the data. In particular, the database 1044 may be arranged with any database organization or structure including, but not limited to, a relational database, a hierarchical database, a network database, or combinations thereof. A database management system in the form of a computer software application executing as instructions on the processor 1032 may be used to access the information or data stored in records of the database 1044 in response to a query, where a query may be dynamically determined and executed by the operating system 1046, other applications 1048, or one or more modules.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A control system for a spacecraft configured to revolve around celestial body in an orbit, the control system comprising:
  one or more magnetic torque rods;
  one or more processors in electronic communication with the one or more magnetic torque rods; and a memory coupled to the one or more processors, the memory storing data into a database and program code that, when executed by the one or more processors, causes the control system to:
  determine ephemeris information regarding a position of the spacecraft relative to the celestial body is inaccessible, wherein a magnetic field of the celestial body is predictable, and a direction of the magnetic field located around the orbit is fixed;
  in response to determining the ephemeris information is inaccessible, calculate a resultant torque imparted upon the spacecraft by the one or more magnetic torque rods based on a dipole moment of the one or more magnetic torque rods and an average magnetic field estimate of the celestial body; and
  instruct the one or more magnetic torque rods to exert the resultant torque upon the spacecraft.

2. The control system of claim 1, wherein the average magnetic field estimate is a fixed vector that represents an average vector of a magnetic flux measured around a circumference of the orbit.

3. The control system of claim 2, wherein a value of the magnetic flux of the magnetic field of the celestial body is substantially constant when measured around the circumference of the orbit.

4. The control system of claim 2, wherein a value of the magnetic flux of the magnetic field of the celestial body varies when measured around the circumference of the orbit.

5. The control system of claim 1, wherein the one or more processors execute instructions to:
  calculate a required magnitude and direction of the resultant torque;
  determine the resultant torque for both a positive state and a negative state of the dipole moment; and
  select the positive state, the negative state, or an off state of the dipole moment based on the required magnitude and direction of the resultant torque.

6. The control system of claim 1, wherein the dipole moment represents a single magnetic torque rod of the spacecraft, and wherein the resultant torque imparted upon the spacecraft is based on the single magnetic torque rod.

7. The control system of claim 1, wherein the dipole moment represents all magnetic torque rods on the spacecraft, and wherein the resultant torque imparted upon the spacecraft is based on all the magnetic torque rods on the spacecraft.

8. A spacecraft configured to revolve around a celestial body in an orbit, the spacecraft comprising:
  a plurality of external actuators that include one or more magnetic torque rods;
  one or more processors in electronic communication with the plurality of external actuators; and
  a memory coupled to the one or more processors, the memory storing data into a database and program code that, when executed by the one or more processors, causes the spacecraft to:
    determine ephemeris information regarding a position of the spacecraft relative to the celestial body is inaccessible, wherein a magnetic field of the celestial body is predictable, and a direction of the magnetic field located around the orbit is fixed;
    in response to determining the ephemeris information is inaccessible, calculate a resultant torque imparted upon the spacecraft by the one or more magnetic torque rods based on a dipole moment of the one or more magnetic torque rods and an average magnetic field estimate of the celestial body; and
    instruct the one or more magnetic torque rods to exert the resultant torque upon the spacecraft.

9. The spacecraft of claim 8, wherein the average magnetic field estimate is a fixed vector that represents an average vector of a magnetic flux measured around a circumference of the orbit.

10. The spacecraft of claim 9, wherein a value of the magnetic flux of the magnetic field of the celestial body is about constant when measured around the circumference of the orbit.

11. The spacecraft of claim 9, wherein a value of the magnetic flux of the magnetic field of the celestial body varies when measured around the circumference of the orbit.

12. The spacecraft of claim 8, wherein the one or more processors execute instructions to:
  calculate a required magnitude and direction of the resultant torque;
  determine the resultant torque for both a positive state and a negative state of the dipole moment; and
  select the positive state, the negative state, or an off state of the dipole moment based on the required magnitude and direction of the resultant torque.

13. The spacecraft of claim 8, wherein the dipole moment represents a single magnetic torque rod of the spacecraft, and wherein the resultant torque imparted upon the spacecraft is based on the single magnetic torque rod.

14. The spacecraft of claim 8, wherein the dipole moment represents all magnetic torque rods on the spacecraft, and wherein the resultant torque imparted upon the spacecraft is based on all the magnetic torque rods on the spacecraft.

15. The spacecraft of claim 8, wherein the spacecraft includes a main body defining a principal axis.

16. The spacecraft of claim 15, wherein the one or more processors execute instructions to:
  instruct the spacecraft to substantially align the principal axis of the spacecraft with a vector that is normal to the orbit around the celestial body.

17. A method for determining a resultant torque imparted upon a spacecraft by one or more magnetic torque rods, wherein the spacecraft is configured to revolve around a celestial body in an orbit, the method comprising:
  determining, by a computer, ephemeris information regarding a position of the spacecraft relative to the celestial body is inaccessible, wherein a magnetic field of the celestial body is predictable, and a direction of the magnetic field located around the orbit of the spacecraft is fixed;
  in response to determining the ephemeris information is inaccessible, calculating the resultant torque imparted upon the spacecraft by the one or more magnetic torque rods based on a dipole moment of the one or more magnetic torque rods and an average magnetic field estimate of the celestial body; and
  instructing the one or more magnetic torque rods to exert the resultant torque upon the spacecraft.

18. The method of claim 17, further comprising:
  calculating a required magnitude and direction of the resultant torque;
  determining the resultant torque for both a positive state and a negative state of the dipole moment; and
  selecting the positive state, the negative state, or an off state of the dipole moment based on the required magnitude and direction of the resultant torque.

19. The method of claim 17, further comprising:
  determining the resultant torque imparted upon the spacecraft is based on the dipole moment representing all magnetic torque rods on the spacecraft.

20. The method of claim 17, further comprising:
   determining the resultant torque imparted upon the spacecraft is based on the dipole moment representing a single magnetic torque rod.

\* \* \* \* \*